United States Patent [19]

Furukawa

[11] Patent Number: 5,319,287
[45] Date of Patent: Jun. 7, 1994

[54] VERTICAL DEFLECTION CIRCUIT

[76] Inventor: Toshihiko Furukawa, Tsukimino-Village, B-1-904, No. 4-5-1, Tsukimino, Yamato-shi, Kanagawa 242, Japan

[21] Appl. No.: 975,563

[22] PCT Filed: Jun. 5, 1991

[86] PCT No.: PCT/JP91/00757
  § 371 Date: Apr. 2, 1993
  § 102(e) Date: Apr. 2, 1993

[87] PCT Pub. No.: WO92/22167
  PCT Pub. Date: Dec. 10, 1992

[51] Int. Cl.⁵ .................. H01J 29/70; H01J 29/76
[52] U.S. Cl. ....................................... 315/397
[58] Field of Search ........................... 315/396, 397

[56] References Cited

U.S. PATENT DOCUMENTS 4,031,430  6/1977  Enomoto ........................ 315/397

FOREIGN PATENT DOCUMENTS 59-104862  6/1984  Japan.
62-264769 11/1987  Japan.
64-85476   3/1989  Japan.
2312388   12/1990  Japan.

Primary Examiner—Theodore M. Blum
Attorney, Agent, or Firm—Young & Thompson

[57] ABSTRACT

The invention relates to a vertical deflection circuit of a cathode ray tube (CRT) using electromagnetic deflection. In the vertical deflection circuit, there is provided a pulse width varying unit for making both a vertical output transistor operated by a forward vertical deflection current and a transistor boosting-up during a vertical fly-back interval turn ON and OFF concurrently, in addition for adjusting an output pulse width from a circuit supplying a vertical blanking pulse to an image circuit. The pulse width is so adjusted that an initial portion of a vertical deflection is over-deflected thereby keeping a detection signal for an automatic white balance adjustment which is inserted immediately after the vertical blanking pulse from appearing on an underscanned color CRT screen.

1 Claim, 5 Drawing Sheets

PRIOR ART

VERTICAL DEFLECTION CIRCUIT

TECHNICAL FIELD

The present invention relates to a vertical deflection circuit for a cathode ray tube (hereinafter referred to as a CRT) using an electromagnetic deflection, and more particularly to a vertical deflection circuit which prevents signals for an automatic white balance detection from appearing on a screen of under-scanned color monitors.

BACKGROUND OF THE ART

In the conventional color monitors or color picture receiver, detecting signals for the automatic white balance detection are used for automatic white balance adjustment circuits which automatically adjust the white balance or semiautomatic white balance adjustment circuits requiring a preset. Such automatic white balance detection signals follow vertical blanking signals. FIG. 2 is a connection diagram of a basic structure of the automatic white balance circuits which use the automatic white balance detection signals. FIG. 3 is a view illustrative of signal wave-forms of the automatic white balance detecting signals.

In FIG. 2, a circuit block 10 comprises circuits for generating the automatic white balance detection signals and picture driver circuits. The circuit block 10 at its input side receives vertical blanking pulses and image signals and is connected to an output side of an error amplifier 16. The circuit block 10 at its output side is connected to a base of an image output transistor 18. The image output transistor 18 is connected at its collector side through a pull-up resistance 20 to a positive power supply +E, in addition through a diode 22 to a cathode of the CRT. The image output transistor 18 is grounded at its emitter side through a resistance 26. The diode 22 is connected at its anode and cathode sides to a p-n-p transistor 28 at its base and emitter respectively. The p-n-p transistor 28 is connected at its collector to sample-hold circuits 30 and is grounded through a resistance 32. The sample-hold circuits 30 are connected at its output side to a positive input terminal of the error amplifier 16. A negative input terminal of the error amplifier 16 is grounded through a reference power supply 34.

The conventional automatic white balance circuits so constructed are operated as follows. Normally, as shown in FIG. 3, the automatic white balance detection signals synchronize with horizontal signals and indicate a white level voltage. Such automatic white balance detection signals are inserted during n interval 2H immediately after the vertical blanking signal in which H is the interval between starting times of a scanning line and a next scanning line. A current being proportional to a cathode current $I_K$ of the CRT flows through the p-n-p transistor 28 to the resistance 32 so that a voltage $V_{RS}$ is generated at the resistance 32. A voltage value of a part of the voltage corresponding to the automatic white balance detection signals is subjected to the sample-hold by a sampling pulse $V_P$ of the sample hold circuits 30 and inputted into a positive input terminal of the error amplifier 16 having at its one output side the reference voltage supply 34. The error amplifier 16 makes a feed-back of the difference of the inputted voltage by the sample hold circuits 30 from the reference voltage $V_r$ to the circuit block 10. The circuit block 10 controls a base voltage of an image output transistor 18 so as to change a collector voltage $V_c$ of the image output transistor 18. As a result, automatic balance circuits are so operated as to keep the cathode current $I_K$ of the CRT constant.

However, according to the above automatic balance circuits, when a normal vertical deflection circuit is used as a vertical deflection circuit which generates vertical blanking pulses 12 to be inputted to the circuit block 10, there exists the following problem. In the normal TV broadcast picture receiver, the over-scanning so appears that the scanning lines are largely deflected in the vertical and horizontal directions from the CRT screen. As a result, when the normal vertical deflection circuit is used to make the deflection, the automatic white balance detection signals inserted immediately after the vertical blanking pulses appears outside the screen and thus dose not appear on the screen. In such a case, there exists no problem. However, in a CRT of a color monitor such as a medical display monitor, there exists a problem in that detection signals clearly appear on an upper portion of the screen as white lines.

It is such reason that although the scanning lines of the color monitors are deflected so as to appear small inside the CRT screen, for example, 99% thereby resulting in the under-scanning. This is undesirable for the screen performance.

Accordingly, it is an object of the present invention to provide a vertical deflection circuit capable of producing a normal screen in which the automatic white balance detection signals inserted to make the automatic white balance adjustment do not appear on the screen.

It is a further object of the present invention to provide a vertical deflection circuit having a freely adjustable detecting signal deflection position, which remains within the CRT as to minimize a secondary reflection of electron beams, if any.

SUMMARY OF THE INVENTION

A vertical deflection circuit for a cathode ray tube using electromagnet deflection according to the present invention is characterized in that there is provided a pulse width varying unit for making a vertical output transistor operated during a forward vertical deflection current as pulses synchronizing with a vertical synchronous signal, and a boost-up transistor during a vertical flyback interval turn ON/OFF simultaneously, in addition for adjusting an output pulse width from a supply circuit for supplying vertical blanking pulses to an image circuit so as to make a vertical deflection of an initial portion of a vertical scanning of the cathode ray tube be over-deflected.

The vertical deflection circuit of the present invention vertically deflects the initial portion of the vertical scanning of the CRT. Thus, the detection signals for the automatic white balance adjustment inserted immediately after the vertical blanking signals are so scanned as to be outside the CRT screen and thus do not appear on the screen. This permits keeping the two white lines from appearing on the under-scanned CRT screen.

DETAILED DESCRIPTION OF THE INVENTION

An embodiment of the vertical deflection circuit according to the present invention will hereinafter be described in detail with reference to the accompanying drawings.

Figure 1:
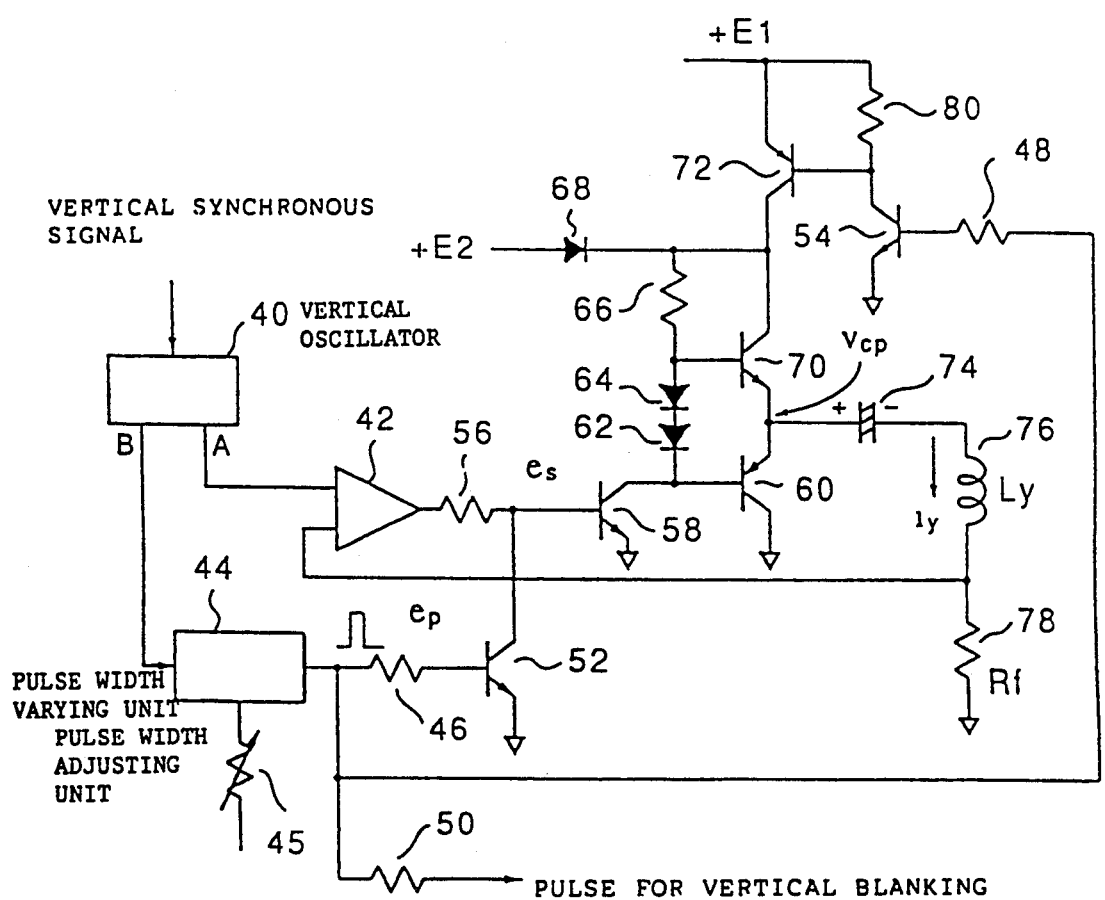
FIG. 1 is a connection diagram illustrative of an embodiment of a vertical deflection circuit according to the present invention.
Figure 2:
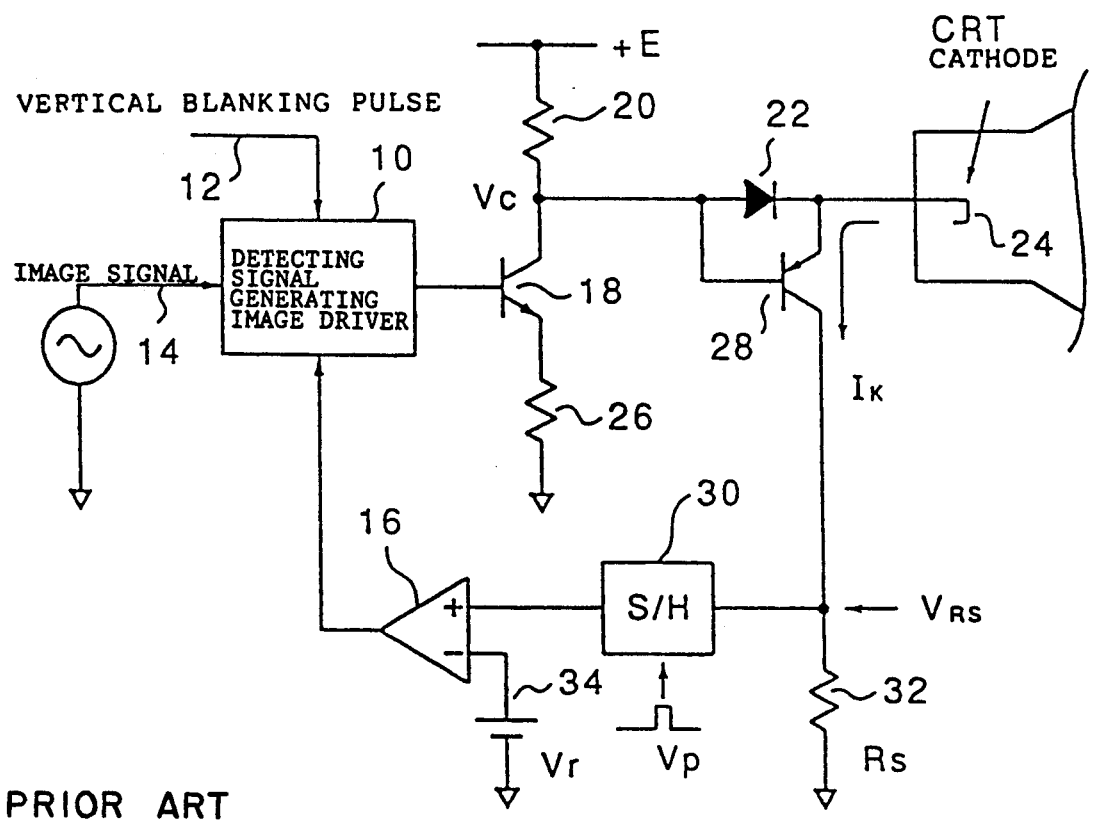
FIG. 2 is a connection diagram illustrative of a basic structure of an automatic white balance circuit using detecting signals for automatic white balance adjustment.

FIG. 1 is a connection diagram illustrative of an embodiment of a vertical deflection circuit according to the present invention. In FIG. 1, a vertical oscillator 40 is inputted with vertical synchronous signals. The vertical oscillator 40 is connected at its output terminal A to one of input terminals of an amplifier 42. The vertical oscillator 40 is connected at its output terminal B to an input terminal of a pulse width varying unit 44. Further, the pulse width varying unit 44 is connected at its input terminal to an output terminal of a pulse width adjusting unit 45. The pulse width varying unit 44 is connected at its output terminal through a resistance 46 to a base of an n-p-n transistor 52, in addition through a resistance 48 to a base of an n-p-n transistor 54, and further pulses for vertical blanking pulses are outputted through a resistance 50. The amplifier 42 is connected at its output terminal through a resistance 56 to a collector of the n-p-n transistor 52 and to a base of an n-p-n transistor 58. The n-p-n transistor 58 is connected at its collector to a base of an p-n-p transistor 60, in addition through a series circuit comprising diodes 62 and 64, a resistance 66 and a diode 68 to a positive power supply +E2. The series circuit comprising the diodes 62 and 64 is connected between the bases of a p-n-p transistors 60 and an n-p-n transistor 70. The n-p-n transistor 70 is connected at its collector to a collector of an p-n-p transistor 72. The resistance 66 is connected between the collector and base of the n-p-n transistor 70. Both emitters of the transistors 70 and 60 are respectively connected to a positive terminal of an electrolytic capacitor 74. The electrolytic capacitor 74 is connected at its negative terminal through a vertical deflection yoke 76 to another input terminal of the amplifier 42, in addition is grounded through a resistance 78. The n-p-n transistor 54 is connected at its collector to the base of the p-n-p transistor 72, and further through a resistance 80 to a positive power supply +E1 and to an emitter of the p-n-p transistor 72. The emitters of the n-p-n transistors 52, 54 and 58 and the collector of the p-n-p transistor 60 are respectively grounded.

The operation of the vertical deflection circuit so constructed and illustrated in FIG. 1 will be described with reference to FIGS. 1, 4 and 5.

In the circuit illustrated in FIG. 1, when a positive or negative vertical synchronous signal is inputted to the vertical oscillator 40, the vertical oscillator 40 generates a voltage for the vertical deflection having a saw-tooth wave-form at the output terminal A. Concurrently, the vertical oscillator 40 generates pulses synchronizing with the vertical synchronous pulses at the output terminal B. The amplifier 42 serves to drive the n-p-n transistor 58. The circuit comprising the n-p-n transistors 58 and 70, the p-n-p transistor 60, the resistance 66, the diodes 62 and 64 and the electrolytic capacitor 74 serve as a push-pull circuit for applying a predetermined vertical deflection current to the vertical deflection yoke 76. The circuit comprising the p-n-p transistor 72, the n-p-n transistor 54 and the resistances 48 and 80 serves as a boost-up circuit for making a boost up to the positive power supply +E1 but during the fly-back period of the vertical scanning depending upon the output pulse from the pulse width varying unit 44. The diode 68 is operated as a switching diode supplying the positive power supply +2E during the vertical scanning period only.

Figure 4:
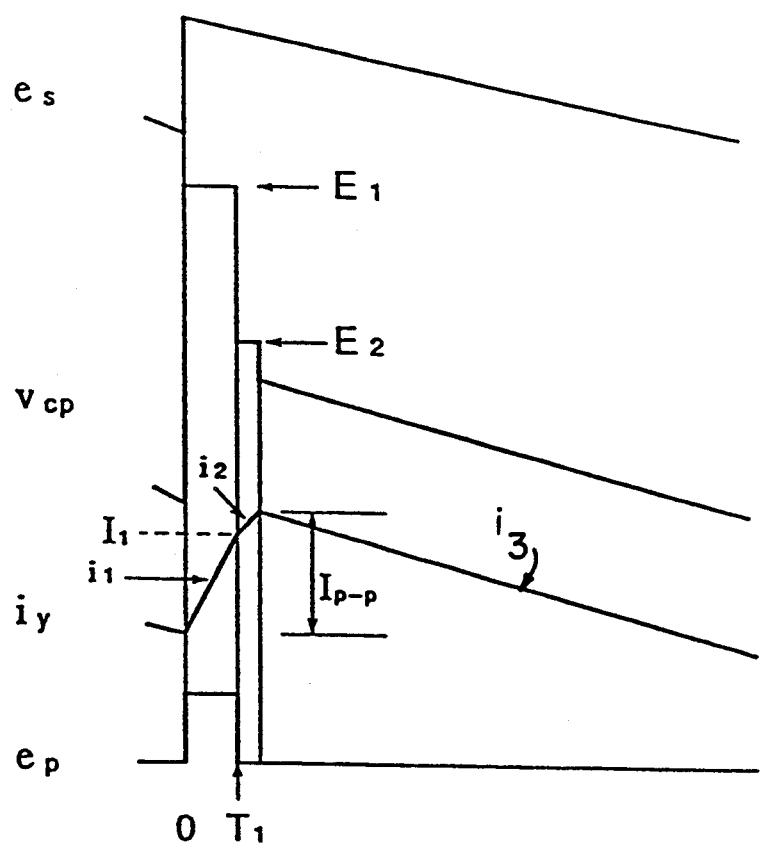
FIG. 4 is a view illustrative of signal wave-forms, when the influence of the detection signals appears on the CRT screen in the vertical deflection circuit according to the present invention.

When the pulse width adjusting unit 45 so accomplishes the adjustment that the signal wave-form of the output voltage $e_p$ of the pulse width varying unit 44 has a pulse width T1, each of the signal wave-forms $e_s$, $v_{cp}$ and $i_y$ has a wave-form as illustrated in FIG. 4. The signal wave-form $e_s$ is the input signal wave-form to the n-p-n transistor 58. The signal wave-form $v_{cp}$ is the output signal wave-form from the above push-pull circuit. The signal wave-form $i_y$ is the deflection coil current flowing through the vertical deflection yoke 76.

When the pulse width varying unit 44 generates the output width T1 voltage pulse $e_p$, of the vertical deflection yoke current $i_y$ has a wave-form including three sloped portions i1, i2 and i3 as illustrated in FIG. 4. The three sloped portion of the above current wave-form are respectively given by:

$$i1 = (E_1/R)a(t) \tag{1}$$

$$i2 = (E_2/R)a(t) \tag{2}$$

$$i3 = I_y(t) \tag{3}$$

where a(t) is given by:

$$a(t) = 1 - \exp(-(R/L_y)t) \tag{4}$$

where

R: $R = r + Rf$, r: the resistance of the vertical deflection yoke,

Rf: the resistance value of the feed-back resistance 78,

E1: the voltage of the positive power supply +E1,

E2: the voltage of the positive power supply +E2, and $L_y$: the inductance of the vertical deflection yoke 76.

The n-p-n transistor in the push-pull circuit illustrated in FIG. 1 is supplied with a base current transmitted from the positive power supply +E2 through the resistance 66, thereby always taking the ON state when the n-p-n transistor 58 takes the OFF state. In the interval T1, the n-p-n transistors 52 and 54 are turned ON by the pulse voltage $e_p$. Then, the n-p-n transistor 58 turns OFF and the p-n-p transistor 72 turns ON. As a result, the collector of the n-p-n transistor 70 takes a voltage E1 approximately equal to the voltage of the positive power supply +E1. Since the E1 is greater than E2, the power supply +E2 is disconnected by the switching diode 68. The base of the p-n-p transistor is supplied with a base current transmitted from the positive power supply +E1 through the p-n-p transistor 72 and the resistance 66, thereby holding the ON state. Thus, the deflection current $i_y$ is supplied from the positive power supply $+E_1$ to the vertical deflection yoke 76 through the n-p-n transistor 70. The deflection current $i_y$ has the sloped current wave-form i1 as illustrated in FIG. 4 and the peak current value I1 is given by:

$$I_1 = (E_1/R)a(T_1) \quad (5).$$

After T1, the n-p-n transistor 54 turns OFF and the p-n-p transistor 72 turns OFF. The deflection current $i_y$ is supplied from the positive power supply $+E_2$ to the vertical deflection yoke 76 through the transistor 70 in the push-pull circuit. As illustrated in FIG. 4, since the deflection current $i_y$ is supplied from the positive power supply immediately after T1, the deflection current $i_y$ is increased along the slope as expressed by the above equation (2), after which the deflection current $i_y$ is decreased along the slope as expressed by the above equation (3). On the pulse width T1, the deflection current $i_y$ has a peak after the T1. Namely, there exists the detecting signal in the deflection current interval smaller than the peak of the deflection current $i_y$ immediately after the vertical blanking pulse $e_p$ on the screen of the under-scanned CRT at the pulse width of T1. As a result, similarly to the conventional vertical deflection circuits, detection signals for the automatic white balance adjustment appear as two white lines on the CRT screen.

Figure 3:
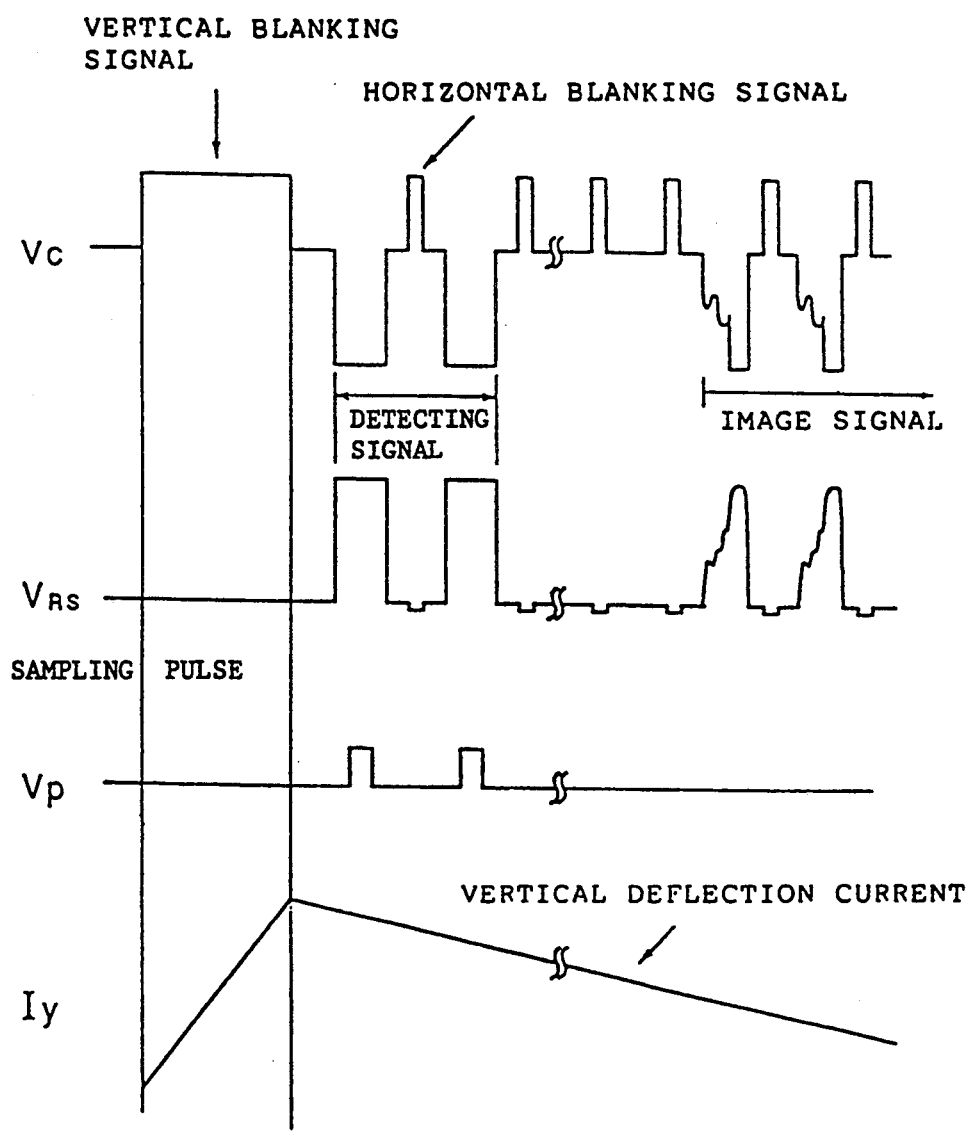
FIG. 3 is a view illustrative of signal wave-forms of each part of the automatic white balance circuit illustrated in FIG. 2.

For example, assuming that the CRT surface has a vertical length of 12 cm and the under-scanned screen has a vertical length of 10 cm, when the peak-to-peak current value $I_{p-p}$ of the deflection current $i_y$ is 1A, the beam is deflected by 10 cm in the vertical direction. But, as illustrated in FIG. 4, the vertical blanking pulse $e_p$ is followed by the detection signals for the automatic white balance adjustment as illustrated in FIG. 3. Thus, the detection signals have a current less than $I_{p-p}$ or 1A and take a position less than 10 cm in the vertical direction of the CRT screen. As a result, the detection signals appear as the two white lines on the screen.

Figure 5:
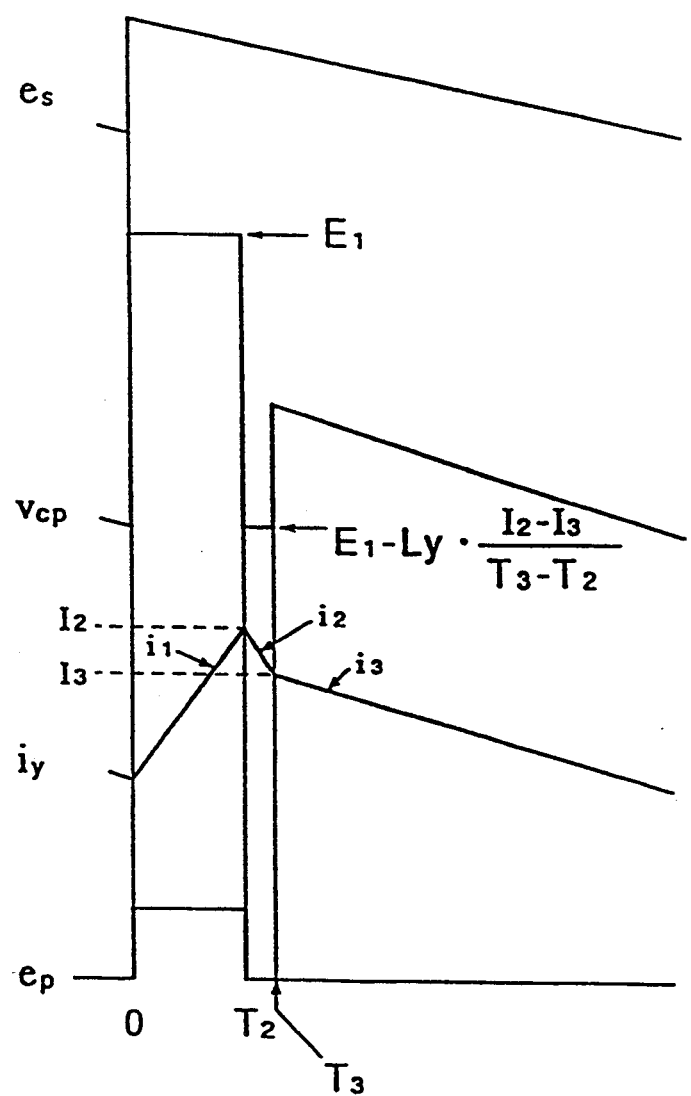
FIG. 5 is a view illustrative of signal wave-forms, when the detection signals are so over-deflected by the vertical deflection circuit as not to appear on the CRT screen according to the present invention.

As illustrated in FIG. 5, when the pulse width varying unit 44 broadens the width of its output pulse $e_p$ to T2 by the pulse width adjusting unit 45, during the interval T2 the n-p-n transistors 52 and 54 take ON states. Thus, as described the above, the n-p-n transistor 58 takes OFF state and the n-p-n transistor 70 and the p-n-p transistor 72 take ON states. Then, during the interval T2, the deflection current $i_y$ flowing from the positive power supply $+E_1$ to the vertical deflection yoke 76 is the current i1 expressed by the above equation (1). The deflection current $i_y$ has a peak current value I2 given by:

$$I_2 = (E_1/R)a(T_2) \quad (6).$$

The peak current value I2 is reduced to the value provided by the following equation (7) during the interval T2. After the interval T2, the peak current value I2 is reduced according to the following equation (8). The equations (7) and (8) are given by:

$$i3 = I_y(T_2) \quad (7), \text{ and}$$

$$T_4 = I_2 \exp(-(R/L_y)t) \quad (8).$$

An energy is accumulated in the vertical deflection yoke 76 until the peak current value I2 is emitted through the vertical deflection yoke 76 and the feedback resistance 78. At that time, the peak current value I2 has a value i2. As illustrated in FIG. 5, T3 taking the current value I3 is found from the following equation (9), thereby resulting in the following equation (10). The equations (9) and (10) are given by:

$$I_3 = I_2 \exp(-(R/L_y)T_3) \quad (9), \text{ and}$$

$$I_4 = T_2 + (L_y/R)\text{Ln}(I_2/I_3) \quad (10).$$

The output voltage $e_p$ of the pulse width varying unit 44 has the same wave-form as the vertical blanking pulse described the above. As can easily be understood from the detection signals illustrated in FIG. 3, the detection signals for the automatic white balance adjustment are generated immediately after the output voltage pulse $e_p$ illustrated in FIG. 5. At that time, if the deflection current takes such value as to have the detection signals appear outside the screen, the detection signals do not appear on the screen. The power supplies E1 and E2 are suitably selected as compared with the inductance value $L_y$ of the vertical deflection yoke 76, thereby taking a sufficient large peak current value I2. Then, the width of the output voltage pulse $e_p$ adjusted by the pulse width adjusting unit 45 is such that the detection signals are distributed between the T2 and T3. By such adjustment, the scanning portion of the detection signals for the automatic white balance adjustment is so over-deflected as to be outside the screen, thereby preventing the detection signals from appearing on the CRT screen, and thus keeping the two white lines from appearing on the under-scanned screen at its upper portion.

When the CRT surface has a vertical length of 12 cm and the under-scanned screen has a vertical length 10 cm, the peak-to-peak current value $I_{p-p}$ is 1A and the beam is deflected in the vertical direction by 10 cm. Then, in order to deflect the detection signals outside the screen, the deflection current is required to be at least 1.2 A or greater but only where the detection signals are positioned. The adjustment is so accomplished that the current value I3 as the peak-to-peak current value in the T3 of the deflection current $i_y$ becomes 1A, in addition the current value I2 as the peak-to-peak current value in the T2 of the deflection current $i_y$ becomes 1.2 A. Each of the pulse widths T1, T2 and T3 are given by:

$$I_1 = \frac{E_1}{R}\left(1 - e^{-\frac{R}{L_y}T_1}\right) \quad (11)$$

$$\therefore T_1 = \frac{L_y}{R} \ln\left(\frac{\frac{E_1}{R}}{\frac{E_1}{R} - I_1}\right)$$

$$T_2 = \frac{L_y}{R} \ln\left(\frac{\frac{E_1}{R}}{\frac{E_1}{R} - I_2}\right) \quad (12)$$

$$T_3 = \frac{L_y}{R} \ln\left(\frac{\frac{E_1}{R}}{\frac{E_1}{R} - I_2}\right) \cdot \frac{I_3}{I_2} \quad (13)$$

According to the present invention, the vertical output transistor is operated during the period of the forward vertical deflection current of the pulses synchronizing with vertical synchronous signals. Both the above transistor and the transistor for boosting-up the deflection current during vertical fly-back period are so operated as to turn ON and OFF concurrently. The circuit commonly using vertical blanking pulse to be supplied to the image circuit is so constructed that only in a predetermined period during the initial vertical scanning of the cathode ray tube, the peak current is generated to perform the overscanning of the vertical deflection of the initial vertical scanning. This permits preventing the detection signals for the automatic white balance adjustment to appear as the white lines on the CRT screen.

Although the preferred embodiment of the present invention has been described, it is not intended to limit the invention to the above embodiment. Accordingly, it is to be intended by the claims to cover all modifications of the present invention which fall within the spirit and scope of the invention.

I claim:

1. A vertical deflection circuit for a cathode ray tube using electromagnetic deflection comprising:

a pulse width varying unit receiving vertical blanking pulses from a vertical blanking pulse generating circuit, said pulse width varying unit generating output voltage pulses which turn a vertical output transistor and a boost-up transistor ON and OFF concurrently, said vertical output transistor being operated by a forward deflection current synchronized with vertical deflection signals, said boost-up transistor boosting up a deflection current flowing through a vertical deflection yoke and being operated during a fly-back period;

a pulse width adjusting unit, connected to said pulse width varying unit, for adjusting said output voltage pulses to have a width sufficient to cause an initial portion of a cathode ray tube vertical scanning to be over-deflected relative to a remaining portion of said cathode ray tube scanning, thereby keeping an automatic white balance adjustment detection signal inserted immediately after said vertical blanking pulse from appearing on an under-scanned cathode ray tube.

* * * * *